US007551306B2

(12) United States Patent
Yoshizawa et al.

(10) Patent No.: US 7,551,306 B2
(45) Date of Patent: Jun. 23, 2009

(54) IMAGE FORMING APPARATUS AND METHOD FOR CONTROLLING THE IMAGE FORMING APPARATUS

(75) Inventors: Ryuichi Yoshizawa, Yokohama (JP); Atsuya Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 11/459,563

(22) Filed: Jul. 24, 2006

(65) Prior Publication Data

US 2007/0024883 A1 Feb. 1, 2007

(30) Foreign Application Priority Data

Jul. 29, 2005 (JP) ............................ 2005-221588

(51) Int. Cl.
*G06F 3/12* (2006.01)
*H04N 1/60* (2006.01)

(52) U.S. Cl. ....................... 358/1.15; 358/518; 358/1.9; 358/1.13

(58) Field of Classification Search .................. 358/1.1, 358/1.5, 1.6, 1.9, 1.11, 1.12, 1.13, 1.14, 1.15, 358/1.16, 1.17, 1.18, 501, 518, 407, 468, 358/449, 498, 1.2; 347/2, 3, 5, 14, 23; 399/1, 399/8, 38, 370, 371; 382/162, 167
See application file for complete search history.

(56) References Cited

U.S. PATENT DOCUMENTS 6,290,318 B1 * 9/2001 Yasukawa .................... 347/16

FOREIGN PATENT DOCUMENTS

JP 6-54117 2/1994
JP 6-62249 3/1994

* cited by examiner

*Primary Examiner*—Dov Popovici
(74) *Attorney, Agent, or Firm*—Fitzpatrick, Cella, Harper & Scinto

(57) ABSTRACT

In an image forming apparatus constructing a color table corresponding to a kind of recording material, provided is an image forming apparatus which includes an engine controlling unit for outputting a vertical synchronizing signal in consideration of a time required for a controller to construct the color table. The engine controlling unit and the controller are included. The engine controlling unit notifies the controller of an assumed kind of recording material and the kind of recording material actually detected. When the two are not identical, the controller reconstructs the color table corresponding to the detected kind of recording material. The engine controlling unit does not output, to the controller, the vertical synchronizing signal for outputting image data during the time when the controller constructs the color table.

18 Claims, 10 Drawing Sheets

IMAGE FORMING APPARATUS AND METHOD FOR CONTROLLING THE IMAGE FORMING APPARATUS

BACKGROUND OF THE INVENTION

1. Field of the Invention

The present invention relates to an image forming apparatus and the like, in which a color table (color conversion table) is constructed according to a kind of recording material. More specifically, the present invention relates to the image forming apparatus outputting a vertical synchronizing signal of an image signal required for outputting image data in consideration of a time required for color table construction, and to a method for controlling the image forming apparatus.

2. Description of the Related Art

FIG. 1 is a block diagram showing a configuration of a laser printer as an image forming apparatus.

In FIG. 1, the image forming apparatus includes an image forming unit 100, paper feeding units 20*a* and 20*b* (reference numeral 20*a* denotes a main body paper feeding unit and reference numeral 20*b* denotes an external paper feeding unit), and image fixing units 10*a* and 10*b*.

Configuration of Image Forming Unit

First, a configuration of the image forming unit 100 will be described briefly.

The image forming unit 100 includes photosensitive drums 1*a* to 1*d*, which are four image bearing members, and charging means 2*a* to 2*d* in a circumference of the photosensitive drums 1*a* to 1*d* for uniformly charging the surfaces of the photosensitive drums 1*a* to 1*d* sequentially, according to a rotation direction. Moreover, the image forming unit 100 includes exposure means 3*a* to 3*d* for forming an electrostatic latent image on the photosensitive drums 1*a* to 1*d* by irradiating laser beams based on image information. In addition, the image forming unit 100 includes developing means 4*a* to 4*d* for attaching toner to the electrostatic latent image to be developed as a toner image, and transfer members 5*a* to 5*d* for transferring the toner images on the photosensitive drums 1*a* to 1*d* to a recording material. Furthermore, the image forming unit 100 includes cleaning means 6*a* to 6*d* or the like for removing toner after the transfer of the toner, which is residual on the surfaces of the photosensitive drums 1*a* to 1*d* after the transfer. Here, the photosensitive drums 1*a* to 1*d*, the charging means 2*a* to 2*d*, the developing means 4*a* to 4*d*, and the cleaning means 6*a* to 6*d* are integrally formed as a cartridge so as to form process cartridges 7*a* to 7*d*. On the other hand, feeding units 20*a* and 20*b* supply the recording material to the image forming unit 100. The recording material fed from the paper feeding units 20*a* and 20*b* is conveyed to the image forming unit 100 by a transfer conveyer belt 9, which is a transfer conveyer belt. Next, the toner image in each color is sequentially transferred to the recording material so that a multicolor image is formed. Next, the recording material is thermally fixed with the toner image by a fixing belt 10*a* and an elastic pressure roller 10*b*, and is discharged to and loaded on a discharging unit 13 by a pair of discharging rollers 10.

Next, the configuration and operation of the image forming unit 100 will be described in detail.

The photosensitive drums 1*a* to 1*d* as image bearing members are configured by applying an organic photo conductor (OPC) layer onto an outer circumferential surface of an aluminum cylinder. The photosensitive drums 1*a* to 1*d* are rotatably supported at both ends thereof by a flange, and are rotary-driven counterclockwise in relation to the figure by receiving driving force from a driving motor (not shown) at one end.

Each of the charging means 2*a* to 2*d* is a conductive roller formed in a roller shape, and uniformly charges the surfaces of the photosensitive drums 1*a* to 1*d* by causing each of the charging means 2*a* to 2*d* to abut on the surfaces of the photosensitive drums 1*a* to 1*d*, and by concurrently applying a charge biasing voltage from a power source (not shown) thereto.

Each of the exposure means 3*a* to 3*d* has a polygon mirror, and image light corresponding to an image signal is irradiated from a laser diode (not shown) to this polygon mirror.

The developing means respectively adjoin toner storing units 4*a*1 to 4*d*1, in which each color of black, cyan, magenta, and yellow is stored, and the surfaces of the photosensitive elements. The developing means is configured of developing rollers 4*a*2 to 4*d*2 and the like for carrying out development by being rotary-driven by the driving unit (not shown), and by being applied of a development biasing voltage from a development biasing power source (not shown).

Inside the transfer conveyer belt 9, the transfer members 5*a* to 5*d*, which touch the transfer conveyer belt 9, are respectively attached so as to be opposite to the four photosensitive drums 1*a* to 1*d*. The transfer members 5*a* to 5*d* are connected to a transfer biasing power source (not shown), and a positive electric charge is applied from the transfer members 5*a* to 5*d* to the recording material through the transfer conveyer belt 9. With this electric field, each color of toner images of a negative electric charge on the photosensitive drums 1*a* to 1*d* is sequentially transferred to the recording material, which is in contact with the photosensitive drums 1*a* to 1*d*, so that a multicolor image is formed.

Next, the operation of conveying the recording material in the image forming unit 100 will be described in detail.

The recording material fed to the image forming unit 100 from the feeding units 23*a* and 23*b* in the paper feeding units 20*a* and 20*b* passes through an interstice between an intermediate conveyer roller 23*a* and a resist roller 15. A recording material kind determining sensor 12 is provided between the intermediate conveyer roller 23*a* and the resist roller 15. The recording material kind determining sensor detects a kind of recording material passing therethrough. After the kind of recording material is detected by the recording material kind determining sensor 12, a recording material conveyance speed is changed to a speed for the recording material, and the transfer conveyer belt 9 conveys the recording material to the image forming unit 100 at the changed speed.

The transfer conveyer belt 9 as a recording material carrier is supported by three rollers, which are a driving roller 9*b* and driven rollers 9*c* and 9*d*, in a tensioned condition, and is disposed opposite to all of the photosensitive drums 1*a* to 1*d*. The transfer conveyer belt 9 is moved in circle by the driving roller 9*b* so that the recording material is brought into contact with the photosensitive drums 1*a* to 1*d* by sucking the recording material electrostatically onto the outer circumferential surface opposite to the photosensitive drums 1*a* to 1*d*. With this, the recording material is conveyed to a transfer position by the transfer conveyer belt 9, and the toner images on the photosensitive drums 1*a* to 1*d* are transferred onto the recording material. In addition, in the most upstream position of the transfer conveyer belt 9, there is disposed a suction roller 9*e* which supports the recording material by holding the recording material between the adsorption roller 9*e* and the transfer conveyer belt 9, and which causes the recording material to be sucked on the transfer conveyer belt 9. At the time of conveying the recording material, a voltage is applied to the suction roller 9*e* to form an electric field with the driven roller 9*c* provided opposite to the suction roller 9*e*. Accordingly, dielectric polarization is generated between the transfer conveyer belt 9 and the recording material so as to generate electrostatic suction force thereon.

Configuration of Image Fixing Unit

A fixing unit is to fix the toner image by applying heat and pressure to an image formed on the recording material, and includes a fixing belt 10*a* and an elastic pressure roller 10*b*. The elastic pressure roller 10*b* faces the fixing belt 10*a* with a predetermined pressure contact force with a belt guiding member to form a fixing nip portion N with a predetermined width. In a state where the fixing nip portion is heated up to a predetermined temperature, which then is controlled, the recording material, which is conveyed from the image forming unit 100, and on which toner image is formed, is inserted between the fixing belt 10*a* and the elastic pressure roller 10*a* of the fixing nip portion N, in a state where the image side is faced up. That is, the recording material is inserted facing the fixing belt side. Next, in the fixing nip portion, the recording material is conveyed together with the fixing belt 10*a* in a state where the image side of the recording material is appressed against the outer surface of the fixing belt 10*a*. In the fixing nip portion N, in a process where the fixing belt 10*a* and the recording material are conveyed together, the fixing belt 10*a* heats the fixing nip portion so that the toner image on the recording material is thermally fixed.

Configuration of Feeding Unit

When image formation is performed from the main body feeding unit 20*a*, the recording material is separately fed one by one by a cassette pick-up roller 21*a*, and the recording material is conveyed to the transfer conveyer belt 9 by the resist roller 15 by way of the cassette conveyance roller 22*a* and the intermediate conveyance roller 23*a*. When image formation is performed by feeding the recording material from the outer paper feeding device 20*b*, the recording material is separately fed one by one by a pick-up roller 21*b* of an optional paper feeding device. Next, the recording material is conveyed to the transfer conveyer belt 9 by the resist roller 15 by way of the conveyer roller 22*b* and intermediate conveyer rollers 23*b* and 23*a* of the optional paper feeding device.

Entire Configuration of Controlling System of Image Forming Apparatus FIG. 2 is a block diagram showing an entire configuration of a controlling system of the image forming apparatus of FIG. 1.

According to FIG. 2, this controlling system includes a host computer 200, a controller 201, and an engine controlling unit 202. The engine controlling unit 202 includes a video interface unit 210, a CPU 211, an image processing GA 212, an image controlling unit 213, a fixing controlling unit 214, a paper conveyance unit 215, a drive controlling unit 216, a double face controlling unit 217, and a recording material kind detecting unit 218, and controls each of the above-described elements.

The controller 201 is capable of intercommunication with the host computer 200 and the engine controlling unit 202 (respective signal lines 219, 220 and 221). The controller 201 receives image information and a print instruction from the host computer 200 through the signal line 219. According to the print instruction, the controller 201 transmits a print reserving command and a print starting command to the engine controlling unit 202 through the signal line 220.

When the print starting command is received, the engine controlling unit 202 starts paper feeding operation in the paper feeding unit, and conveys the recording material to a position where the recording material kind determining sensor is disposed between the intermediate conveyance roller 23*a* and the resist roller 15. The engine controlling unit 202 then stops the conveyance to detect a kind of recording material, and restarts conveying the recording material after detecting the kind of recording material. Then, the engine controlling unit 202 outputs a vertical synchronizing signal (/TOP signal), which is an instruction signal for outputting image data, to the controller 201 through the signal line 221.

The controller 201 analyzes image information received from the host computer 200 through the signal line 219 to convert the information into bit data, and constructs a color table to output the image data to the engine controlling unit 202 through the signal line 220, the image data being outputted in synchronization with the vertical synchronizing signal. The color table is a table for converting the bit data into a device color space, and further converting the device color space into CMYK by color separation.

Conveyance Operation of Recording Material and the Like

FIG. 3 is a schematic diagram for describing recording material conveyance at the time of printing operation. FIG. 4 is a flowchart for describing processing cooperatively performed by the controller 201 and the engine controlling unit 202 as a conventional example.

According to FIG. 4, the controller 201 designates, to the engine controlling unit 202, print conditions, such as a print mode instruction and a paper feeding port (20*a*) (S401 and S402). Next, the controller 201 transmits a print reserving command (ID1) and a print starting command (ID1) for each recording material (S403 and S404).

When the print starting command is received from the controller 201, the engine controlling unit 202 carries out printing preparation based on the designated print information (S405), and picks up paper from the paper feeding port 1 (20*a*) with the print mode (for example, a print mode for plain paper) corresponding to the kind of recording material, which is set in advance (hereinafter referred to as "an assumed kind of recording material"), so that paper feeding operation starts (S406, FIG. 3A). The engine controlling unit 202 performs detection of a kind of recording material at the time when the fed recording material reaches a position where the kind of recording material is detected (S407, FIG. 3B), and the detection result is notified to the controller 201 (S408). The engine controlling unit 202 performs switching to image forming conditions, which are optimal for the detected kind of recording material, after detecting the kind of recording material when needed, and outputs the vertical synchronizing signal for outputting the image data to the controller 201 (S411, FIG. 3C). The controller 201 constructs a color table for ID1 corresponding to the kind of recording material notified from the engine controlling unit 202 at S408 (S412), and then outputs the image data in synchronization with the vertical synchronizing signal from the engine controlling unit 202.

It should be noted that, in Japanese Patent Laid-open Application No. S06-62249, there is disclosed a device for detecting the kind of recording material, on which an image is formed, to switch a table value and the like of color converting means corresponding to the detected kind of recording material. According to this device, color reproduction consistent with an original copy is made possible with any kind of recording material used when image formation is performed. Furthermore, in Japanese Patent Laid-open Application No. H06-54117, there is disclosed a device which changes the density of color data registered in the color table at once. According to this device, efficiency of processing time and reduction of transferring data can be promoted, and a load of switching processing after the color table is registered can be reduced further.

In the above-described conventional technologies, however, the controller 201 constructs the color table as color converting processing data for the image data after the engine controlling unit 202 detects the kind of recording material. The image forming operation, therefore, has to be suspended during the time of constructing the color table after the recording material is fed and the kind of recording material is detected. This results in a situation where a time required for image formation becomes longer (because a waiting time until the image formation starts is required).

The color table needs to be constructed in accordance with the kind of recording material (plain paper, thick paper, thin paper, glossy paper, and the like), and a time required for constructing the color table according to the kind of recording material varies. Thus, when image forming operation is suspended as described above, the configuration is set up to be controlled so as to be suspended for a maximum time required for constructing the color table. A time required for image formation, therefore, becomes longer.

Here, it can be considered that the color table is constructed for each kind of recording material, and is recorded in advance in a non-volatile memory or the like in the controller 201. However, because there are many kinds of recording materials, a capacity of the non-volatile memory needs to be larger if color tables corresponding to all kinds of recording material are constructed and recorded therein. This results in increase of the costs. For this reason, from the viewpoint of keeping down the costs, it is preferable that the color table be constructed after the recording material is detected.

In contrast, when the engine controlling unit 202 outputs the vertical synchronizing signal to the controller 201 without considering the time required for the controller 201 to construct the color table, there arises a situation where image formation is not performed correctly. In other words, because the vertical synchronizing signal is outputted from the engine controlling unit 202 to the controller 201 before the color table construction is complete, the controller 201 cannot output the image data. As a result, there arises the situation where image formation is not performed correctly.

SUMMARY OF THE INVENTION

It is an object of the present invention to provide an image forming apparatus, which is capable of shortening a time required for image formation by notifying a controller of a kind of recording material set in advance, and which is capable of correctly carrying out the image formation by giving an output instruction of image data to a controller 201 in accordance with a detected kind of recording material, and to provide a method for controlling the image forming apparatus.

The image forming apparatus according to the present invention has a recording material detecting portion for detecting the kind of recording material, a first controlling portion for generating conversion processing data corresponding to the kind of recording material, the converting processing data being used to convert image information, and a second controlling portion for controlling an image forming operation. The second controlling portion transmits the kind of recording material set in advance and the kind of recording material detected by the recording material detecting portion. The first controlling portion generates image converting processing data corresponding to the kind of recording material set in advance, and determines whether or not the converting processing data corresponding to the detected kind of recording material is generated on the basis of the kind of recording material detected by the recording material detecting portion.

A controlling method of the present invention is a method for controlling the image forming apparatus, including a step of instructing print start, a step of starting paper feeding of the recording material in response to the instruction of the print start, a step of notifying the kind of recording material set in advance before starting the paper feeding of the recording material, a step of generating converting processing data corresponding to the kind of recording material set in advance, the converting processing data being used to convert image information, a step of detecting the kind of recording material after starting the paper feeding of the recording material, and a step of determining whether or not the converting processing data corresponding to the detected kind of recording material is generated on the bases of the detected kind of recording material and the kind of recording material, which is set in advance.

The image forming apparatus according to the present invention has a recording material detecting portion for detecting a kind of recording material, a first controlling portion for generating converting processing data corresponding to the kind of recording material, the converting processing data being used to convert image information, and a second controlling portion for controlling an image forming operation. The second controlling portion transmits to the first controlling portion the kind of recording material set in advance and the kind of recording material detected by the recording material detecting portion. The second controlling portion controls timing for staring to form an image on the recording material, depending on the kind of recording material set in advance and the kind of recording material detected by the recording material detecting portion.

According to the present invention, the engine controlling unit 202 notifies the controller 201 of an assumed kind of recording material so that the controller 201 can construct a color table corresponding to the assumed kind of recording material in advance. With this, the assumed kind of recording material is compared with the detected kind of recording material thereafter. When the two are identical, there is no need to reconstruct the color table, and there is no need to suspend the image forming operation. A time required for the image formation, therefore, can be shortened.

In addition, in the present invention, there is included the engine controlling unit 202, which waits for a time required for the controller 201 to construct the color table, and which outputs a vertical synchronizing signal to the controller 201 after the color table construction is complete. According to the present invention, therefore, the engine controlling unit 202 does not output the vertical synchronizing signal to the controller 201 before the color table construction is complete. Thus, the controller 201 does not receive the vertical synchronizing signal during the time for the color table construction, and therefore, it is made possible to avoid a case where image formation cannot be correctly carried because the controller 201 cannot properly output the image data.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
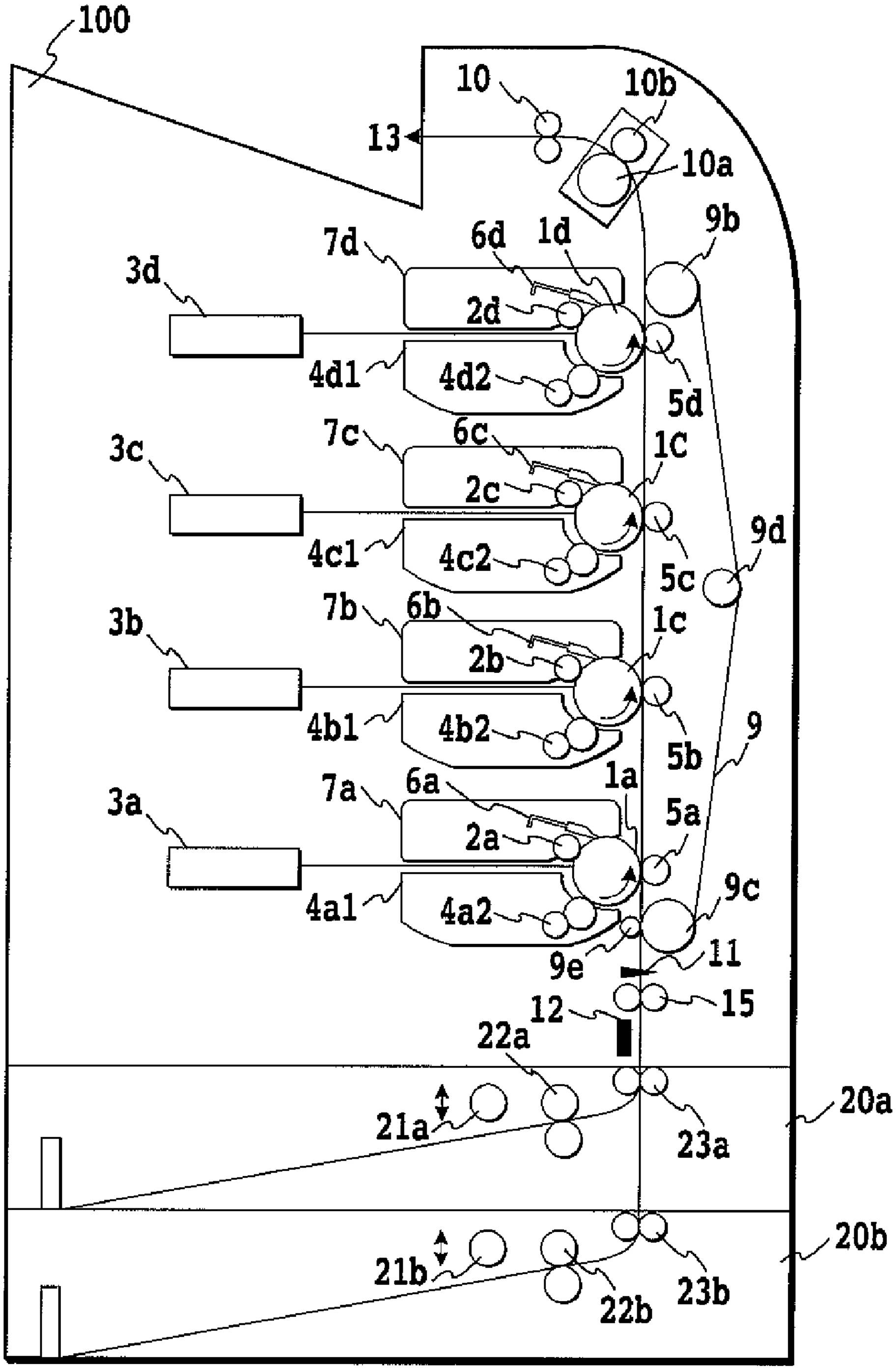
FIG. 1 is a block diagram showing an entire configuration of a laser printer as an image forming apparatus.
Figure 2:
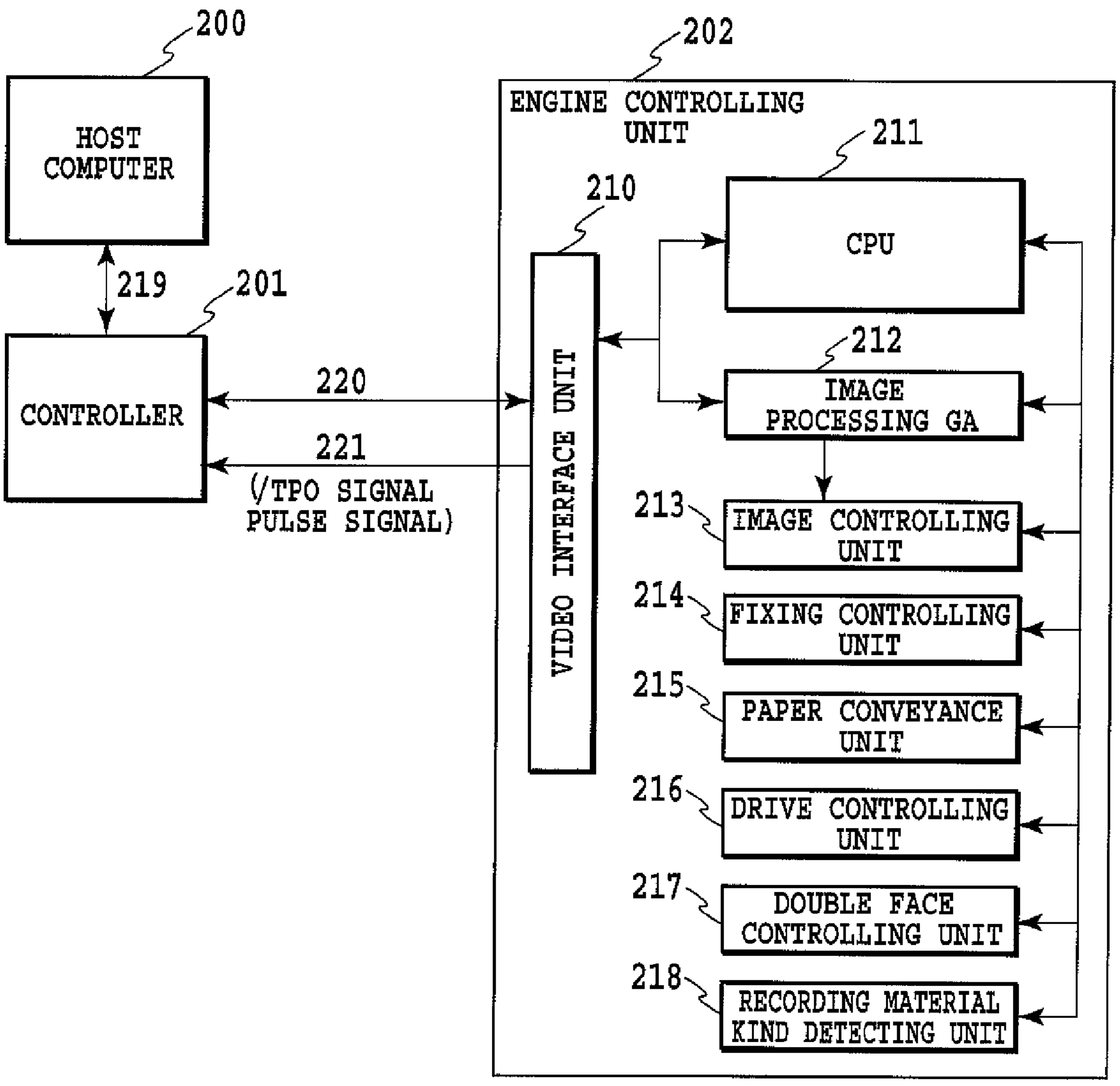
FIG. 2 is a block diagram showing an entire configuration of a controlling system of the image forming apparatus of FIG. 1.
Figure 3C:
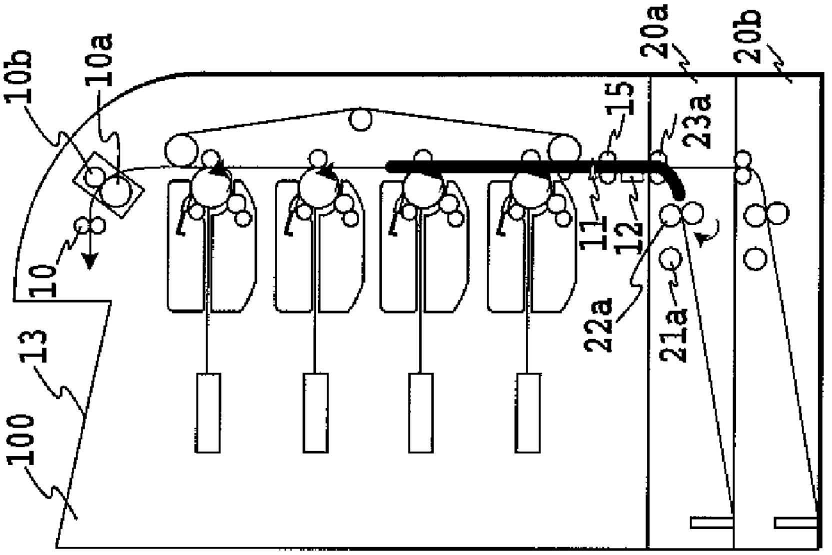
FIG. 3C is a schematic diagram for describing recording material conveyance at the time of printing operation.
Figure 3B:
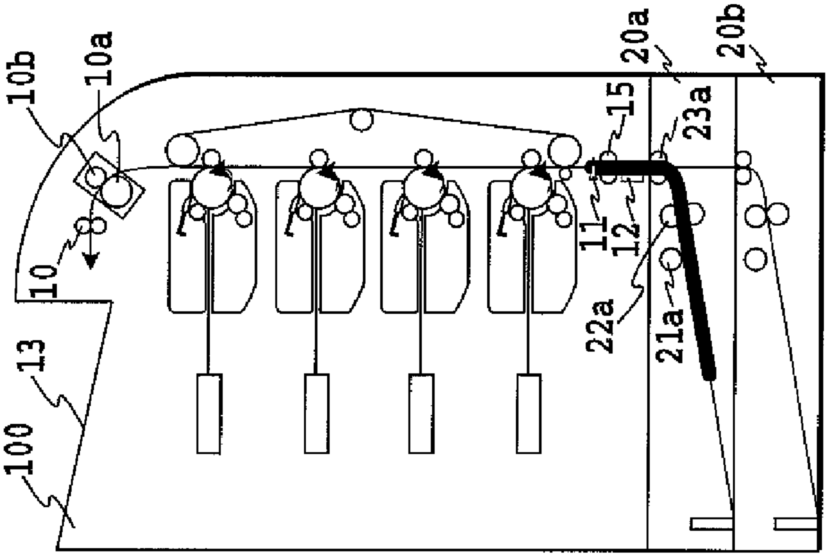
FIG. 3B is a schematic diagram for describing recording material conveyance at the time of printing operation.
Figure 3A:
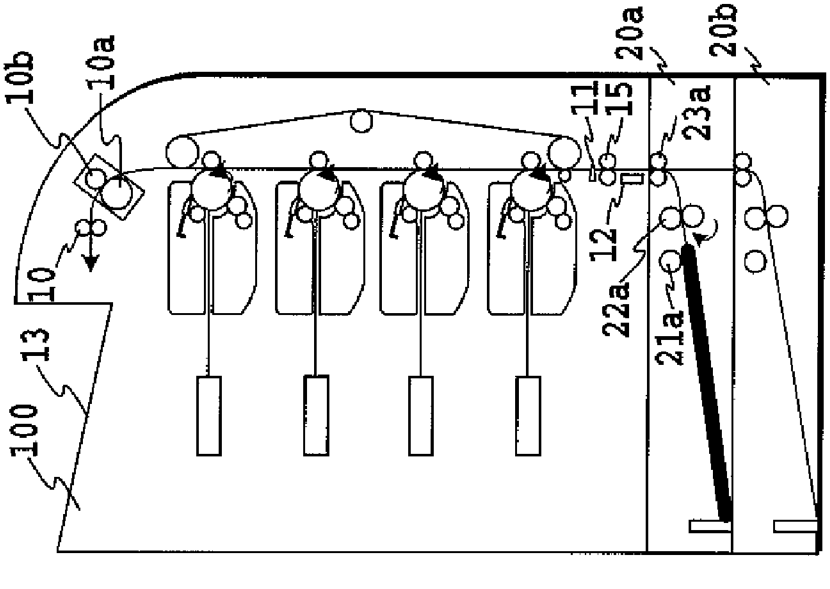
FIG. 3A is a schematic diagram for describing recording material conveyance at the time of printing operation.
Figure 4:
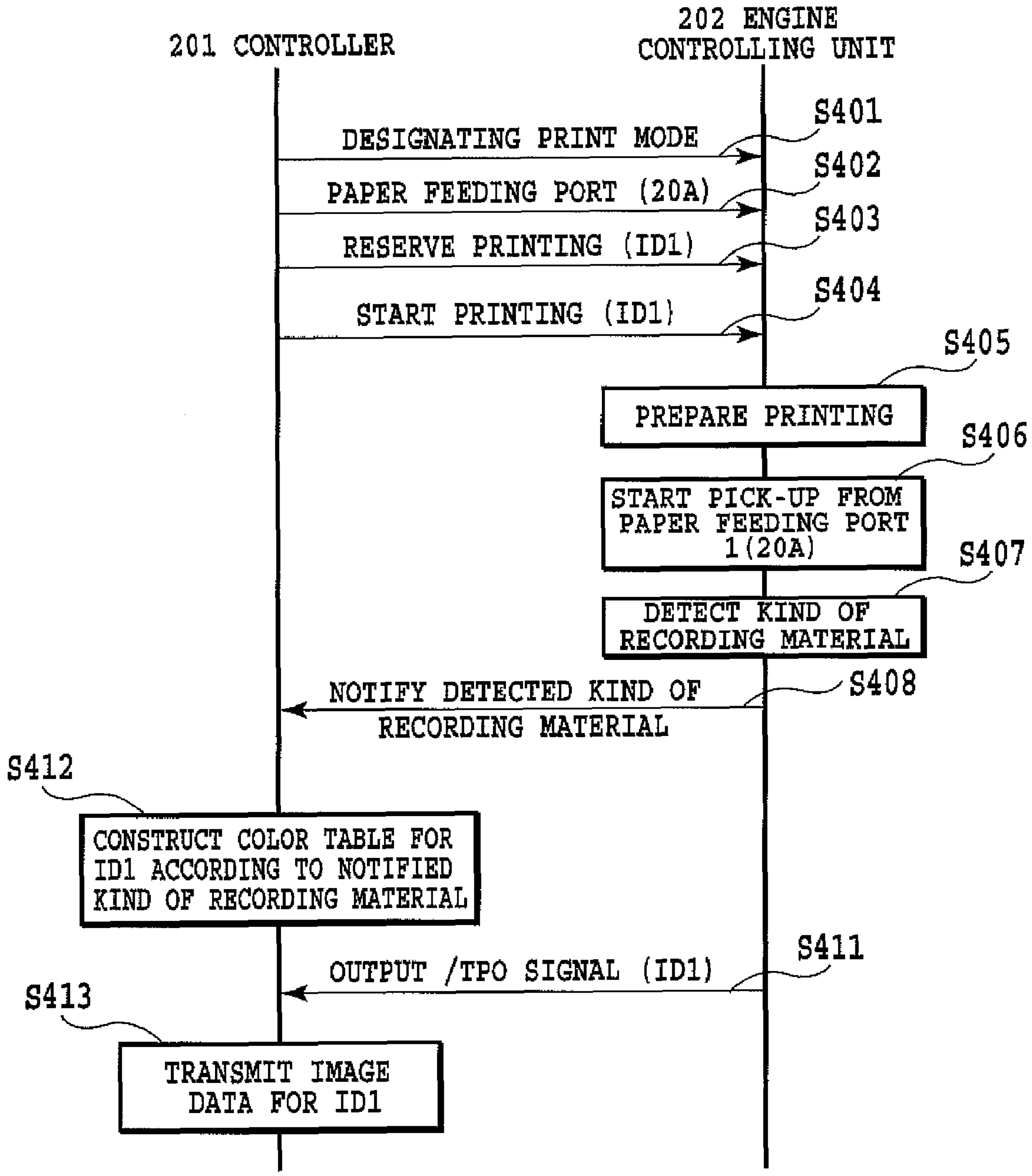
FIG. 4 is a drawing showing a flowchart of processing cooperatively performed by a controller 201 and an engine controlling unit 202 as a conventional example.

Each of the embodiments of the present invention will be described by referring to the drawings.

In a first embodiment, an engine controlling unit 202 transmits information required for a controller to construct a color table as color converting processing data (information regarding a kind of recording material) to a controller 201, and the controller 201 constructs the color table based on the information. With this, the engine controlling unit 202 can recognize timing for the controller 201 to construct the color table, so that the controller 201 can always prepare an optimum color table. Here, the color converting processing data is data for converting color data of the image data.

In short, in the first embodiment, the engine controlling unit 202 notifies the controller 201 of the information on the kind of recording material set in advance (hereinafter referred to as information on an assumed kind of recording material) before detecting the kind of recording material, and the controller 201 constructs the color table in advance on the basis of the information. Here, for example, it is assumed that the assumed kind of recording material is set to "plain paper" in the engine controlling unit 202. The engine controlling unit 202 detects the kind of recording material and a result thereof is notified to the controller 201. The controller 201 reconstructs the color table only when the result shows that the detected kind of recording material is not identical to the assumed kind of recording material (plain paper) set before detecting the kind of recording material. Such cases include a case where the detected kind of recording material is "thick paper". Furthermore, when the assumed kind of recording paper (plain paper) is not identical to the detected kind of recording material, the engine controlling unit 202 does not output a vertical synchronizing signal to the controller 201 during the time when the controller 201 constructs the color table. The time when the controller 201 constructs the color table is defined by a predetermined time from the point when the engine controlling unit 202 notifies the controller 201 of the detected kind of recording material. Note that the predetermined time may be a time based on a point when the engine controlling unit 202 detects the kind of recording material or at another point in time.

Figure 5:
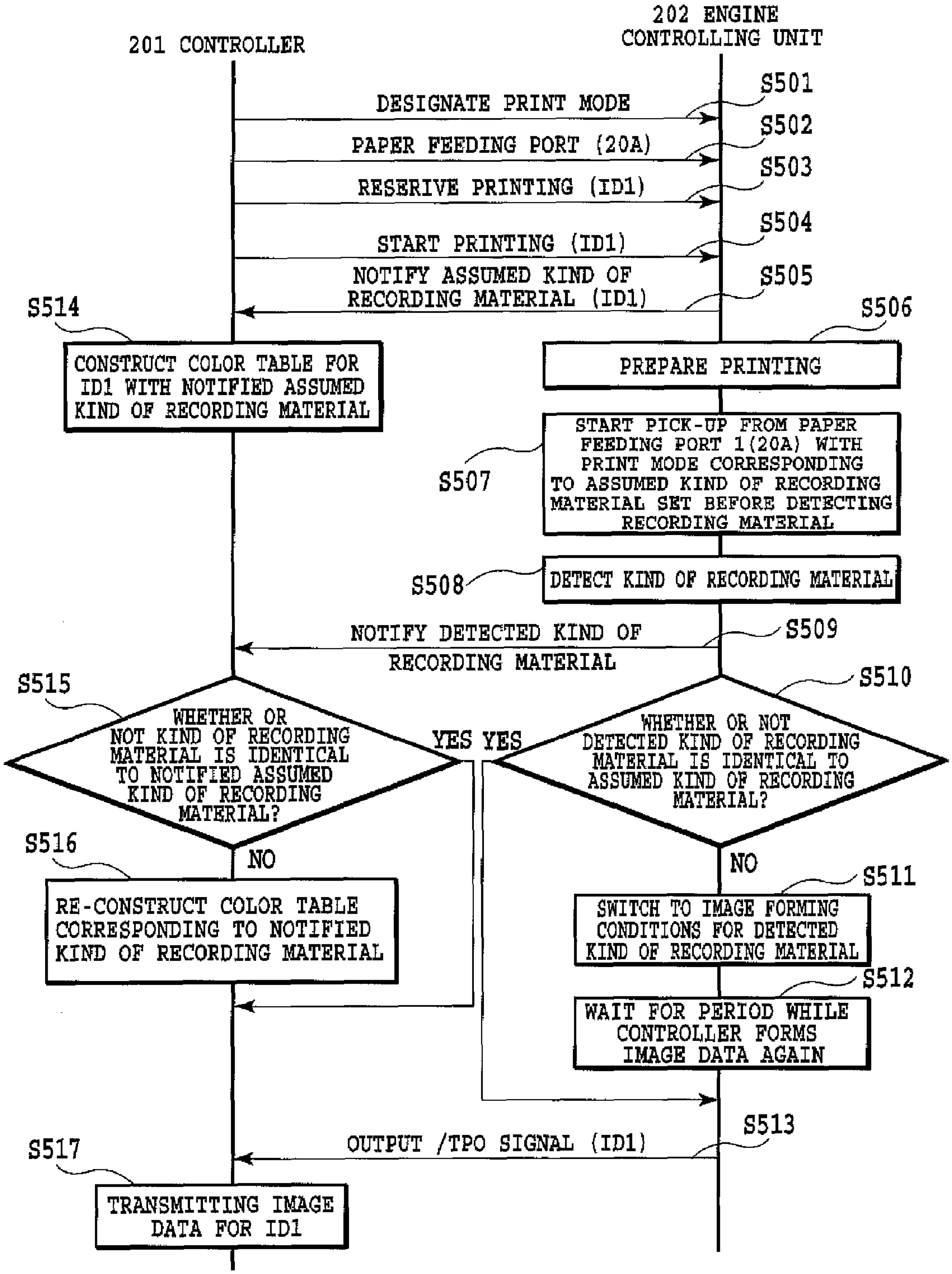
FIG. 5 is a drawing showing a flowchart of processing cooperatively performed by a controller 201 and an engine controlling unit 202 in a first embodiment of the present invention.

FIG. 5 is a flowchart for describing processing, of the first embodiment, which is cooperatively performed by the controller 201 and the engine controlling unit 202.

The controller 201 designates the print conditions, such as a print mode and a paper feeding port (20*a*), in relation to the engine controlling unit 202 (S501 and S502). Next, the controller 201 transmits, to the engine controlling unit 202, a print reserving command (ID1) and a print starting command (ID1), with which a page ID is designated for every recording material (S503 and S504).

When the print starting command (ID1) is received from the controller 201 (S504), the engine controlling unit 202 transmits the assumed kind of recording material (in the present embodiment, "plain paper") set before the engine controlling unit 202 detects the recording material in relation to the controller 201 (S505). On the other hand, the controller 201 starts printing preparation corresponding to the assumed kind of recording material (S506).

The controller 201 constructs the color table for ID1 with the assumed kind of recording material notified from the engine controlling unit 202 (S514).

After completing the printing preparation at S506, the engine controlling unit 202 picks up the recording material from the paper feeding port 1 (20*a*) with the print mode corresponding to the assumed kind of recording material set before detecting the recording material, and starts conveying the recording material (S507).

The engine controlling unit 202 performs the detection of the kind of recording material at the time when the fed recording material reaches a position for detecting the kind of recording material (S508), and notifies the controller 201 of the detected kind of recording material (S509).

The controller 201 determines whether or not the kind of recording material notified from the engine controlling unit 202 at S509 is identical to the assumed kind of recording material which has been already notified from the engine controlling unit 202 at S505 (S515). When these are not identical, the controller 201 constructs the color table corresponding to the kind of recording material notified from the engine controlling unit 202 at S509 (S516). For example, when the detected recording material is thick paper, the color table for thick paper is constructed.

On the other hand, the engine controlling unit 202 determines whether or not the detected kind of recording material is identical to the assumed kind of recording material (S510). When the two are not identical, switching to image forming conditions corresponding to the detected kind of recording material is performed (S511). Next, the engine controlling unit 202 waits for a time required for the controller 201 to construct the color table (S512), and the vertical synchronizing signal required for the controller 201 to output image data is outputted to the controller 201 (S513). When the detected kind of recording material is identical to the assumed kind of recording material, the engine controlling unit 202 proceeds from S510 to S513 to output the vertical synchronizing signal to the controller 201 without waiting for the time for constructing the color table. In other words, the engine controlling unit 202 controls the timing for starting to form an image by changing the timing for outputting the vertical synchronizing signal, depending on the result of comparing the detected kind of recording material with the assumed kind of recording material.

The engine controlling unit 202 recognizes in advance the time required for the controller 201 to construct the color table. For example, when the assumed kind of recording material is set to plain paper in advance, but where the recording material actually detected is thick paper, the engine controlling unit 202 considers a time for the controller 201 to construct the color table for thick paper. Then, the engine controlling unit 202 outputs the vertical synchronizing signal to the controller 201 after the formation time has past, on the basis of a point of notifying the controller 201 of the detected kind of recording material. Alternatively, the engine controlling unit 202 outputs the vertical synchronizing signal to the controller 201 after the formation time has past, on the basis of a point when the engine controlling unit 202 detects the kind of recording material. The engine controlling unit 202 recognizes in advance a time required for constructing the color table corresponding to not only thick paper, but plain paper, thin paper, glossy paper, rough paper, and the like. Specifically, the engine controlling unit 202 has a table or the like holding color table constructing time for each kind of recording material in a ROM (not shown) provided therein.

The time, during which the engine controlling unit 202 waits until the vertical synchronizing signal is outputted, may be set to a time varied for each kind of the recording material as described above, or may be set to a maximum time among the times respectively set for all kinds of the recording material.

When the above-described thick paper is detected, the engine controlling unit 202 performs the operation of switching to operating conditions for carrying out printing on the thick paper. Specifically, the operation of switching includes switching a setting of a printing speed, switching a setting of a fixing temperature, and the like.

Lastly, the controller 201 outputs the image data in synchronization with the vertical synchronizing signal received from the engine controlling unit 202 (S517).

Figure 6:
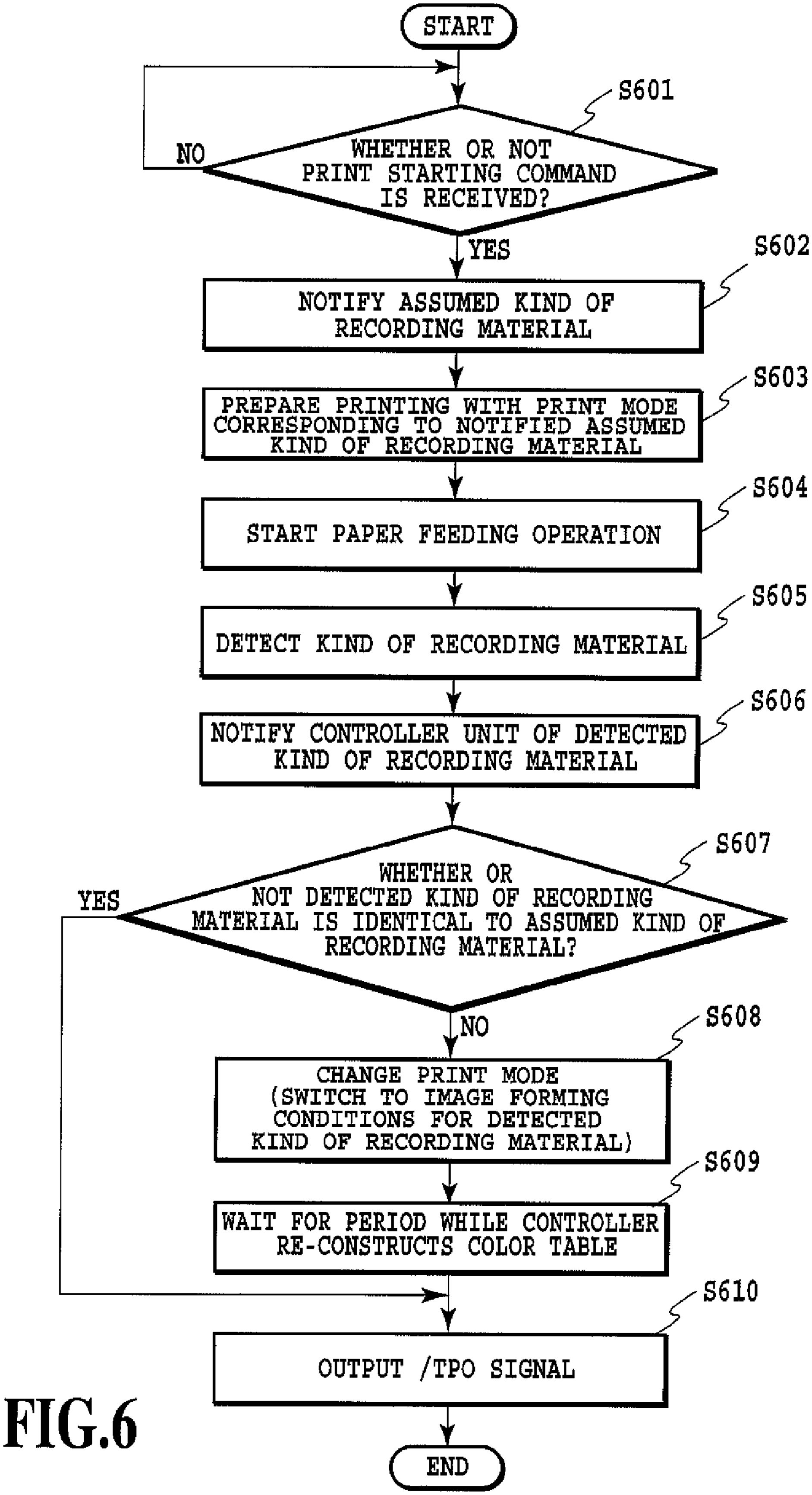
FIG. 6 is a drawing showing a flowchart of processing performed by the engine controlling unit 202 in the first embodiment of the present invention.

FIG. 6 is a flowchart more specifically showing the operation of the engine controlling unit 202 in the first embodiment.

When the print starting command is received from the controller 201 (S601), the engine controlling unit 202 notifies the controller 201 of the assumed kind of recording material before detecting the recording material (S602). Next, the engine controlling unit 202 starts printing preparation with a print mode corresponding to the notified assumed kind of recording material (S603).

After completing the printing preparation at S603, the engine controlling unit 202 starts the paper feeding operation of picking up and conveying the recording material from a designated paper feeding port (S604). The detection of the kind of recording material is performed at the point when the recording material reaches a position the kind of recording material is detected (S605). The detected kind of recording material is notified to the controller S201 (S606).

The engine controlling unit 202 determines whether or not the detected kind of recording material is identical to the assumed kind of recording material (S607). When the two are not identical, the engine controlling unit 202 changes the print mode, switches to the image forming conditions for the detected kind of recording material (S608), and outputs the vertical synchronizing signal to the controller 201 after a predetermined time has past (S609 and S610). In contrast, when the detected kind of recording material is identical to the assumed kind of recording material, the engine controlling unit 202 outputs the vertical synchronizing signal to the controller 201 immediately (S610).

It should be noted that there is a case, in an image forming apparatus having an intermediate transfer element, where image formation is performed before conveying the recording material. In this case, the engine controlling unit 202 outputs the vertical synchronizing signal after notifying the assumed kind of recording material. In the image forming apparatus, therefore, the engine controlling unit 202 outputs the vertical synchronizing signal to the controller 201 after the predetermined time has past, on the basis of the point when the engine controlling unit 202 notifies the kind of recording material. Alternatively, the engine controlling unit 202 outputs the vertical synchronizing signal to the controller 201 after the predetermined time has past, on the basis of the point when the engine controlling unit 202 detects the kind of recording material. The predetermined time is defined by a time required for the controller 201 to construct the color table corresponding to the assumed kind of recording material.

As described above, in the first embodiment, information on the kind of recording material, which is set in advance (an assumed kind of recording material), is transmitted to the controller 201 so that a time required for image formation can be shortened. Then, in response to the detected kind of recording material, the output of the vertical synchronizing signal by the engine controlling unit 202 is delayed until the controller 201 completes the construction of the color table. Accordingly, image formation can be performed correctly.

In the first embodiment, description has been given for the configuration, in which the engine controlling unit 202 considers the timing for outputting the vertical synchronizing signal to the controller 201, when the assumed kind of recording material is identical to the detected kind of recording material, and when the two are not identical on the premise that the assumed kind of recording material is transmitted. More specifically, when the assumed kind of recording material is not identical to the detected kind of recording material, the engine controlling unit 202 outputs the vertical synchronizing signal to the controller 201 after the predetermined time has past from the point when the kind of recording material is notified to the controller 201. The predetermined time is defined by a time, information of which is held in advance by the engine controlling unit 202 for the controller 201 to construct the color table.

On the other hand, in a second embodiment, when the kind of recording material is not identical to the detected kind of recording material, there is a difference, compared with the first embodiment, in that a controller 201 notifies an engine controlling unit 202 of a time required for the controller 201 to construct the color table (a reconstruction time). In the second embodiment, the engine controlling unit 202 outputs the vertical synchronizing signal to the controller 201 after the reconstruction time notified from the controller 201 has past.

Figure 7:
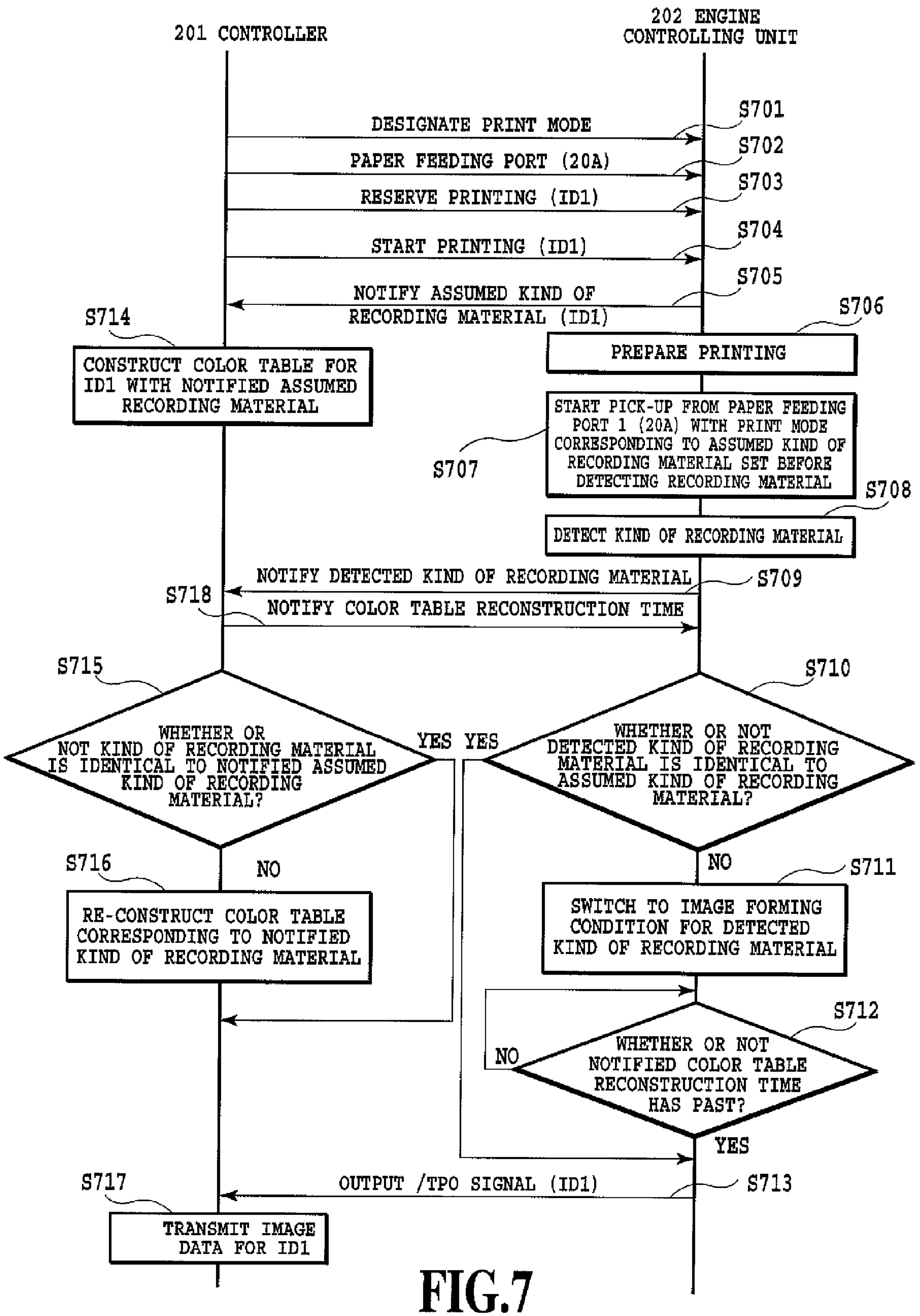
FIG. 7 is a drawing showing a flowchart of processing cooperatively performed by a controller 201 and an engine controlling unit 202 in a second embodiment of the present invention.

FIG. 7 is a flowchart for describing processing cooperatively performed by the controller 201 and the engine controlling unit 202 in the second embodiment.

The controller 201 transmits to the engine controlling unit 202 a print reserving command (ID1), and a print starting command (ID1), in which a page ID is designated for every recording material, after the print conditions, such as a print mode and a paper feeding port (20*a*), are designated (S701 to S704).

When the print starting command (ID1) is received from the controller 201 (S704), the engine controlling unit 202 notifies the controller 201 of the assumed kind of recording material set before detecting the recording material (S705), and starts printing preparation corresponding to the assumed kind of recording material (S706).

The controller 201 constructs the color table for ID1 corresponding to the notified assumed kind of recording material (S714).

After completing the printing preparation at S706, the engine controlling unit 202 starts picking up and conveying the recording material from the paper feeding port 1 (20*a*) with the print mode corresponding to the assumed kind of recording material set before detecting the recording material (S707).

The engine controlling unit 202 performs the detection of the kind of recording material at a point when the fed recording material reaches a position where the kind of recording material is detected (S708), and the detected kind of recording material is notified to the controller 201 (S709).

When the notified kind of recording material is not identical to the assumed kind of recording material, the controller 201 notifies the engine controlling unit 202 of a time required for reconstructing the color table (S718).

Note that the controller 201 recognizes in advance a time required for per se to reconstruct the color table. For example, when the assumed kind of recording material is set in advance to plain paper, but where the recording material actually detected is thick paper, the controller 201 notifies the engine controlling unit 202 of a time for reconstructing the color table for thick paper. The controller 201 recognizes in advance a time required for reconstructing the color table corresponding to not only thick paper, but also plain paper, thin paper, glossy paper, rough paper, and the like. Specifically, the controller 201 has a table or the like holding color table construction time for each kind of recording material in a ROM (not shown) provided therein. When the notified kind of recording material is identical to the assumed kind of recording material, “0” as reconstruction time may be notified, or the construction time needs not to be notified.

When the notified kind of recording material is not identical to the assumed kind of recording material, the controller 201 reconstructs the color table corresponding to the kind of recording material notified from the engine controlling unit 202 (S716). On the other hand, when the notified kind of recording material is identical to the assumed kind of recording material, the step proceeds to S717 without reconstructing the color table.

On the other hand, the engine controlling unit 202 determines whether or not the kind of recording material detected at S708 is identical to the assumed kind of recording material (S710). When the two are not identical, the engine controlling unit 202 performs switching to the image forming conditions corresponding to the detected kind of recording material (S711). Next, after the reconstruction time notified from the controller 201 at S718 has past (S712), the engine controlling unit 202 outputs the vertical synchronizing signal to the controller 201 (S713). When the detected kind of recording material is identical to the assumed kind of recording material, the engine controlling unit 202 proceeds from S710 to S713, so that the vertical synchronizing signal is outputted to the controller 201 immediately.

Lastly, the controller 201 outputs the image data in synchronization with the vertical synchronizing signal received from the engine controlling unit 202 (S717).

Figure 8:
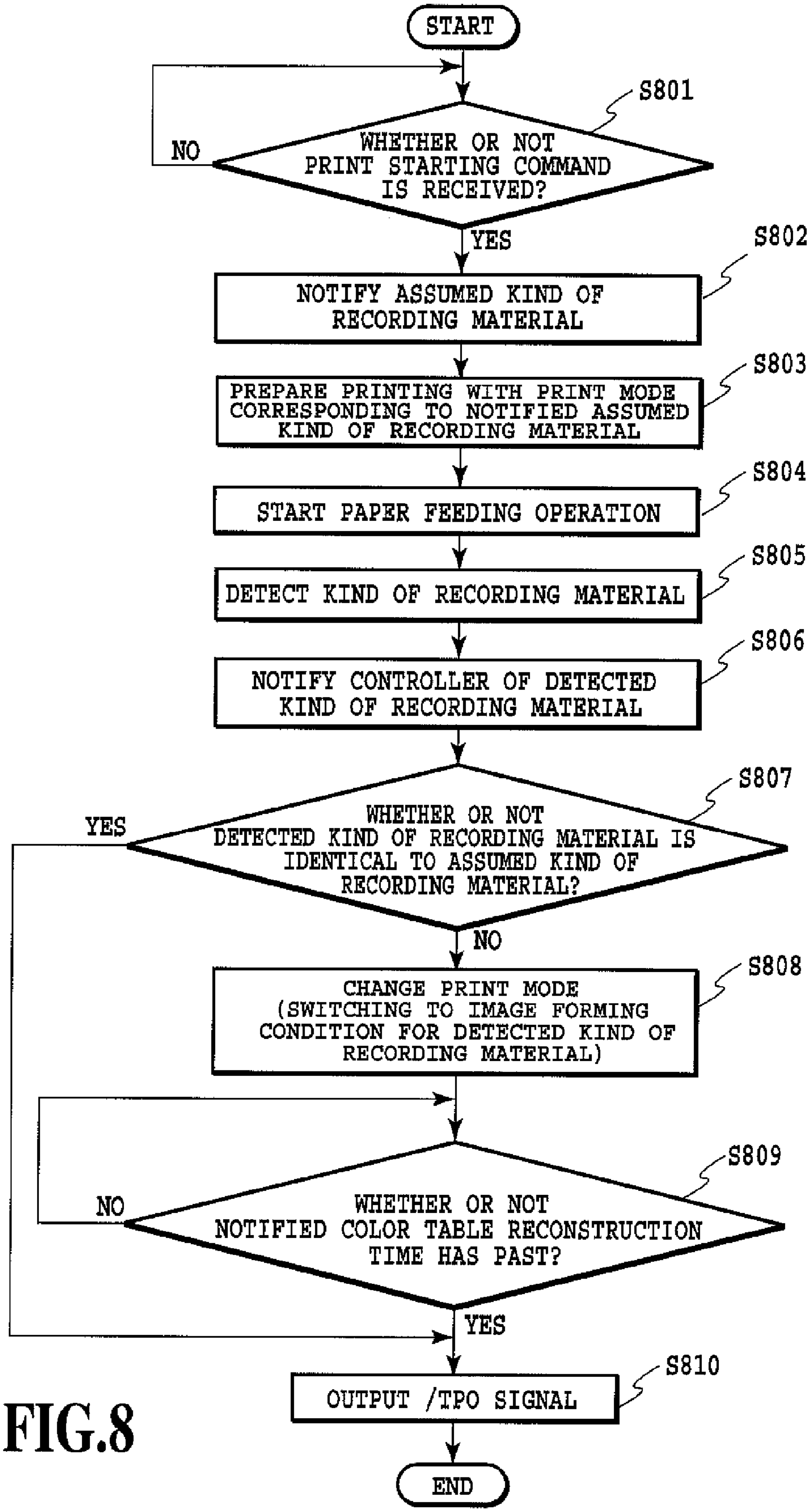
FIG. 8 is a drawing showing a flowchart of processing performed by the engine controlling unit 202 in the second embodiment.

FIG. 8 is a flowchart more specifically showing the operation of the engine controlling unit 202 in the second embodiment.

When the print starting command is received from the controller 201 (S801), the engine controlling unit 202 notifies the controller 201 of the assumed kind of recording material before detecting the recording material (S802). Next, the engine controlling unit 202 starts printing preparation with the print mode corresponding to the notified assumed kind of recording material (S803).

After the printing preparation at S803 is complete, the engine controlling unit 202 starts the paper feeding operation of picking up and conveying the recording material from a designated paper feeding port (S804). The detection of the kind of recording material is performed at the point when the recording material reaches a position where the kind of recording material is detected (S805), and the detected kind of recording material is notified to the controller 201 (S806).

The engine controlling unit 202 determines whether or not the detected kind of recording material is identical to the assumed kind of recording material (S807). When the two are not identical, the engine controlling unit 202 changes the print mode, and switches to the image forming conditions for the detected kind of recording material (S808). Next, the engine controlling unit 202 outputs the vertical synchronizing signal to the controller 201 after the reconstruction time notified from the controller has past, on the basis of a point when the detected kind of recording material is notified to the controller 201 (S809 and S810). Alternatively, the engine controlling unit 202 outputs the vertical synchronizing signal to the controller 201 after the reconstruction time notified from the controller has past, on the basis of the point when the engine controlling unit 202 detects the kind of recording material (S809 and S810). On the contrary to the above, when the detected kind of recording material is identical to the assume kind of recording material, the engine controlling unit 202 outputs the vertical synchronizing signal to the controller 201 immediately (S810).

Note that, in an image forming apparatus having an intermediate transfer element, there is a case where image formation is performed before conveyance of the recording material. In this case, the engine controlling unit 202 outputs the vertical synchronizing signal after notifying the assumed kind of recording material. In the image forming apparatus, therefore, the controller 201 notifies the engine controlling unit 202 of a time required for constructing the color table corresponding to the notified assumed kind of recording material. The engine controlling unit 202 outputs the vertical synchronizing signal to the controller 201 after the time notified from the controller 201 has past, on the basis of the point of notifying the assumed kind of recording material. Alternatively, the engine controlling unit 202 outputs the vertical synchronizing signal to the controller 201 after the time notified from the controller 201 has past, on the basis of a point when the engine controlling unit 202 detects the kind of recording material.

As described above, in the second embodiment, similar to the first embodiment, the information on the kind of recording material set in advance is transmitted to the controller 201 (the assumed kind of recording material) so that a time required for image formation can be shortened. Then, in response to the detected kind of recording material, the output of the vertical synchronizing signal by the engine controlling unit 202 is delayed until the controller 201 completes the construction of the color table. Accordingly, image formation can be performed correctly.

In the second embodiment, color table construction time held by the controller 201 is notified to the engine controlling unit 202. In other words, in the second embodiment, unlike the first embodiment, the engine controlling unit 202 has a configuration in which the output of the vertical synchronizing signal is delayed by a time required for the controller 201 to reconstruct the color table. In the case of the second embodiment, therefore, the engine controlling unit 202 needs not to recognize the color table construction time in advance.

In a third embodiment, when the assumed kind of recording material is not identical to the detected kind of recording material, there is a difference, compared with the first and second embodiments, in that completion of the color table is notified to the engine controlling unit 202 at a timing when the controller 201 completes reconstruction of the color table. In the third embodiment, the engine controlling unit 202 outputs the vertical synchronizing signal after the completion of the color table is notified from the controller 201.

Figure 9:
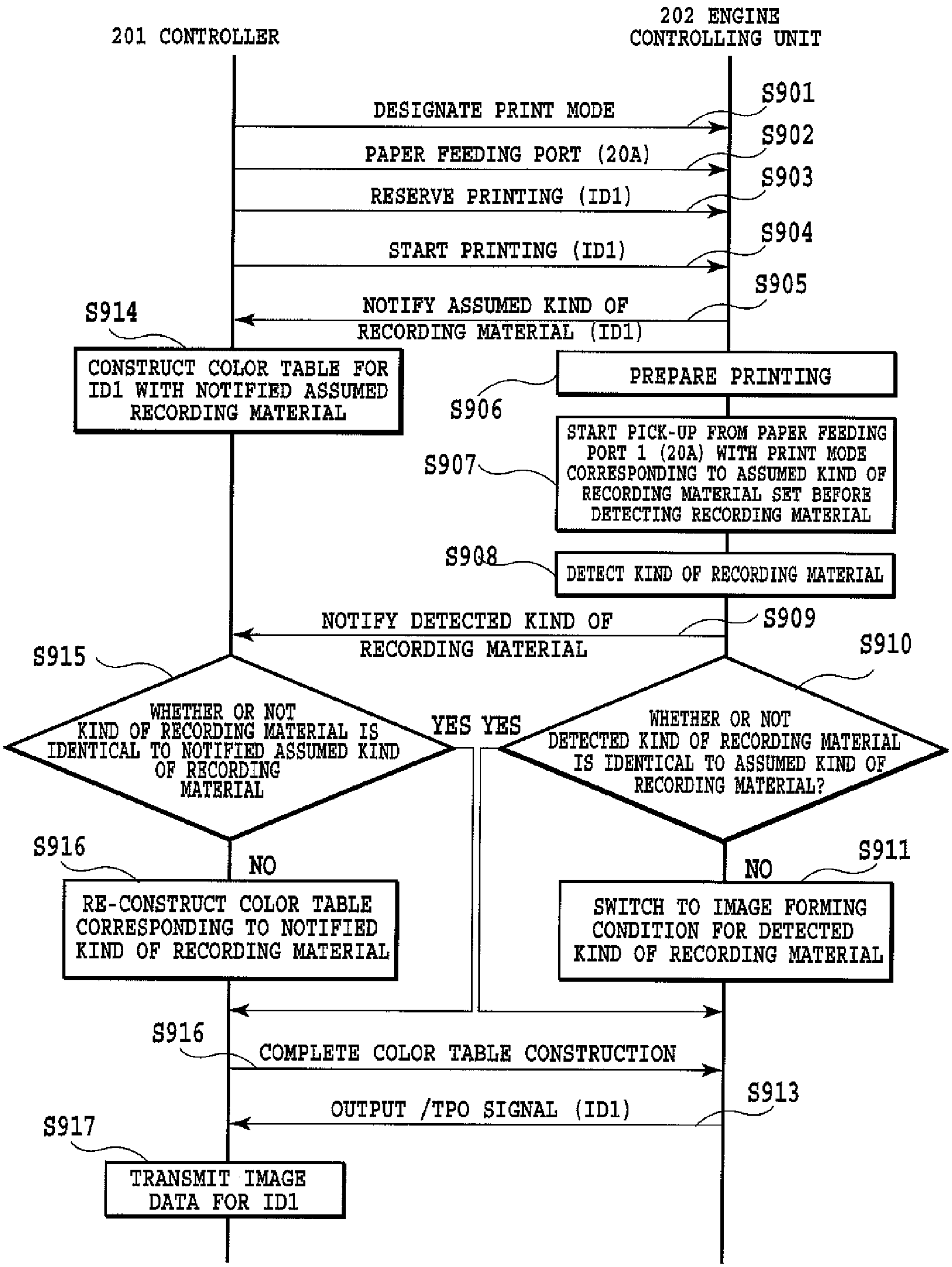
FIG. 9 is a drawing showing a flowchart of processing cooperatively performed by a controller 201 and an engine controlling unit 202 according to a third embodiment.

FIG. 9 is a flowchart for describing processing cooperatively performed by the controller 201 and the engine controlling unit 202 in the third embodiment.

The controller 201 transmits to the engine controlling unit 202 the print reserving command (ID1), and the print starting command (ID1), in which the page ID is designated for each recording material, after the print conditions, such as a print mode and paper feeding port (20*a*), are designated (S901 to S904).

When the print starting command (ID1) is received from the controller 201 (S905), the engine controlling unit 202 notifies the controller 201 of the assumed kind of recording material set before detecting the kind of recording material (S905), and starts printing preparation corresponding to the assumed kind of recording material (S906). The controller 201 constructs the color table for ID1 corresponding to the notified assumed kind of recording material (S914).

After completing the printing preparation at S906, the engine controlling unit 202 starts picking up and conveying the recording material from the paper feeding port 1 (20*a*) with a print mode corresponding to the assumed kind of recording material set before detecting the recording material (S907).

The engine controlling unit 202 performs detection of the kind of recording material at the point when the fed recording material reaches a position where the kind of recording material is detected (S908), and the detected kind of recording material is notified to the controller 201 (S909).

The controller 201 determines whether or not the notified kind of recording material is identical to the assumed kind of recording material, which has been already notified from the engine controlling unit 202 at S905 (S915). When the two are not identical, the controller 201 reconstructs the color table corresponding to the kind of recording material notified from the engine controlling unit 202 at S909 (S916).

On the other hand, the engine controlling unit 202 determines whether or not the detected kind of recording material is identical to the assumed kind of recording material (S910). When the two are not identical, the engine controlling unit 202 performs switching to the image forming conditions corresponding to the detected kind of recording material (S911), and waits for a notification from the controller 201 of the completion of the color table construction. When the two are identical, the processing at S911 is not performed, and the engine controlling unit 202 waits for the notification of the completion of the color table construction.

When the reconstruction of the color table is complete at S916, the controller 201 transmits the notification that the color table construction is complete, to the engine controlling unit 202 (S912).

It should be noted that, when the assumed kind of recording material is identical to the detected kind of recording material at S915, the controller 201 notifies the engine controlling unit 202 of the completion of the color table construction without carrying out reconstruction of the color table.

When the notification that the color table construction is complete is received from the controller 201, the engine controlling unit 202 outputs the vertical synchronizing signal to the controller 201 immediately (S913).

Lastly, the controller 201 outputs the image data in synchronization with the vertical synchronizing signal received from the engine controlling unit 202 (S917).

Figure 10:
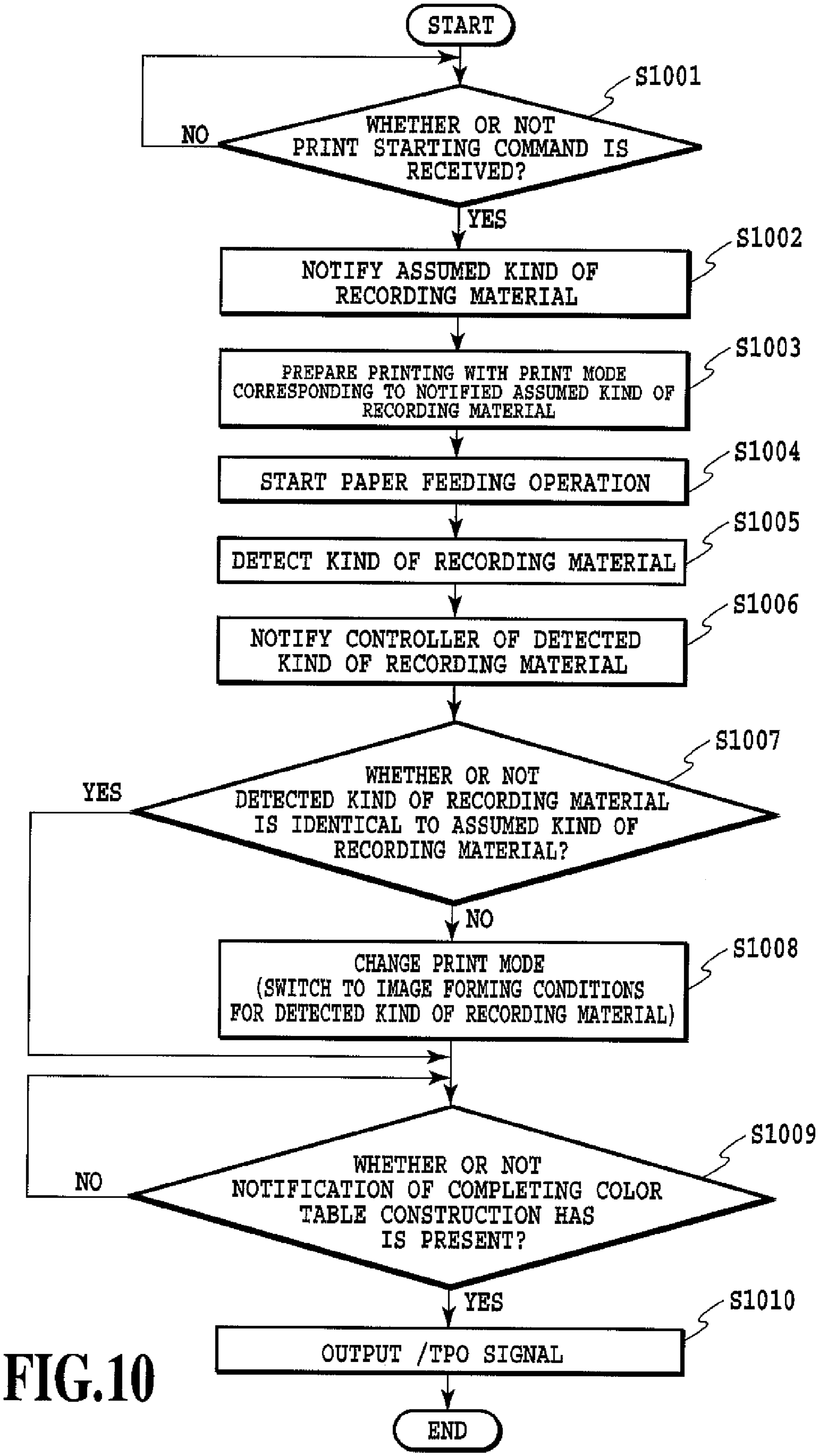
FIG. 10 is a drawing showing a flowchart of processing performed by the engine controlling unit 202 in the third embodiment of the present invention.

FIG. 10 is a flowchart more specifically showing the operation of the engine controlling unit 202 in the third embodiment.

When the print starting command is received from the controller 201 (S1001), the engine controlling unit 202 notifies the controller 201 of the assumed kind of recording material before detecting the recording material (S1002). The engine controlling unit 202 starts printing preparation with the print mode corresponding to the notified assumed kind of recording material (S1003).

After completing the printing preparation at S1003, the engine controlling unit 202 gives instructions to start the paper feeding operation of picking up and conveying the recording material from the designated paper feeding port (S1004). The engine controlling unit 202 performs detection of the kind of recording material at a point when the recording material reaches a position where the kind of recording material is detected (S1005), and the detected kind of recording material is notified to the controller 201 (S1006).

The engine controlling unit 202 determines whether or not the detected kind of recording material is identical to the assumed kind of recording material (S1007). When the two are not identical, the engine controlling unit 202 changes the print mode and switches to the image forming conditions for the detected kind of recording material (S1008). On the contrary to the above, when the detected kind of recording material is identical to the assumed kind of recording material, the engine controlling unit 202 proceeds to processing at S1009.

The engine controlling unit 202 waits for the notification from the controller 201 that the color table construction is complete (S1009), and outputs the vertical synchronizing signal to the controller 201 when the notification is received (S1010).

It should be noted that there is a case, in the image forming apparatus having the intermediate transfer element, where image formation is performed before conveying the recording material. In this case, the engine controlling unit 202 outputs the vertical synchronizing signal after notifying the assumed kind of recording material. In the image forming apparatus, therefore, the controller 201 transmits the notification that the color table construction is complete, to the engine controlling unit 202 at a timing when the construction of the color table corresponding to the notified assumed kind of recording material is complete. Next, when the notification that the switching of the color table is complete is received from the controller 201, the engine controlling unit 202 outputs the vertical synchronizing signal to the controller 201.

As described above, in the third embodiment, similar to the first embodiment, the information on the kind of recording material set in advance is transmitted to the controller 201 (the assumed kind of recording material) so that a time required for image formation can be shortened. Then, in response to the detected kind of recording material, the output of the vertical synchronizing signal by the engine controlling unit 202 is delayed until the controller 201 completes the construction of the color table. Accordingly, image formation can be performed correctly.

In the third embodiment, the controller 201 notifies the engine controlling unit 202 of the completion of the color table construction at the timing thereof. In the third embodiment, therefore, unlike the first and second embodiments, the engine controlling unit 202 needs not to recognize a time for constructing the color table in advance, and can correctly recognize the timing of the point when color table construction completes in the controller 201. As a result, the engine controlling unit 202 can transmit the vertical synchronizing signal to the controller 201 at the optimum timing.

It should be noted that the present invention is applicable to the color image forming apparatus, in which the color table is constructed in accordance with the kind of recording material detected by an engine controlling unit, and is not particularly limited to an image forming apparatus using an electrophotographic process.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes.

This application claims priority from Japanese Patent Application No. 2005-221588 filed on Jul. 29, 2005, which is hereby incorporated by reference herein.

What is claimed is:

1. An image forming apparatus, comprising:

a recording material detecting portion configured to detect the kind of recording material;

a first controlling portion configured to generate converting processing data corresponding to the kind of recording material, the converting processing data being used to convert image information; and a second controlling portion configured to control an image forming operation, and configured to transmit to the first controlling portion the kind of recording material set in advance and the kind of recording material detected by the recording material detecting portion, and wherein the first controlling portion generates the converting processing data corresponding to the kind of recording material set in advance before the recording material detecting portion detects the kind of recording material, and wherein the first controlling portion determines whether or not the converting processing data corresponding to the detected kind of recording material is generated on the basis of the kind of recording material set in advance and the kind of recording material detected by the recording material detecting portion.

2. The image forming apparatus of claim 1, wherein the first controlling portion does not generate the converting processing data corresponding to the detected kind of recording material when the kind of recording material set in advance is identical to the detected kind of recording material.

3. The image forming apparatus of claim 1, wherein the first controlling portion generates the converting processing data corresponding to the detected kind of recording material when the kind of recording material set in advance is not identical to the detected kind of recording material.

4. The image forming apparatus of claim 3, wherein the second controlling portion transmits an output instructing signal of image data to the first controlling portion after a time for the generation of the converting processing data corresponding to the detected kind of recording material has past, the generation being performed by the first controlling portion.

5. The image forming apparatus of claim 3, wherein the first controlling portion transmits, to the second controlling portion, a time for generating the converting processing data corresponding to the detected kind of recording material, and wherein the second controlling portion transmits, to the first controlling portion, an output instructing signal of image data after the transmitted time for generating the converting processing data has passed.

6. The image forming apparatus of claim 3, wherein the first controlling portion transmits, to the second controlling portion, a completion signal showing that the generation of the converting processing data corresponding to the detected kind of recording material is complete, and wherein the second controlling portion transmits, to the first controlling portion, an output instructing signal of image data in response to the completion signal.

7. The image forming apparatus of claim 1, wherein the converting processing data are data for converting color information of image information.

8. The image forming apparatus of claim 1, further comprising a recording material storing portion configured to store the recording material, wherein the second controlling portion transmits, to the first controlling portion, the kind of recording material set in advance before the recording material is supplied from the recording material storing portion.

9. The image forming apparatus of claim 8, wherein, when a print starting instruction is received from the first controlling portion, the second controlling portion is controlled so as to start a paper feeding operation of the recording material from the recording material storing portion, to stop conveyance of the recording material at a position where the kind of recording material is detected by the recording material detecting portion, and to restart conveyance of the recording material after detecting the kind of recording material.

10. A method for controlling an image forming apparatus including a first controller and a second controller, the first controller performing a converting process corresponding to the kind of recording material, the second controller controlling an operation of forming an image, the method comprising the steps of:

the first controller instructing the second controller to start printing;

the second controller notifying the first controller of the kind of recording material set in advance before starting paper feeding of the recording material;

the second controller starting the paper feeding of the recording material in response to a print starting instruction;

the first controller executing converting process corresponding to the kind of recording material set in advance, the converting process being converting image information;

detecting the kind of recording material after starting the paper feeding of the recording material; and the first controller determining whether or not the converting process corresponding to the detected kind of recording material is executed on the basis of the detected kind of recording material and the kind of recording material set in advance.

11. The method of claim 10, further comprising a step of starting an image forming operation without executing the converting process when the detected kind of recording material is identical to the kind of recording material set in advance.

12. An image forming apparatus, comprising:

a recording material detecting portion configured to detect the kind of recording material;

a first controlling portion configured to generate converting processing data corresponding to the kind of recording material, the converting processing data being used to convert image information; and a second controlling portion configured to control an image forming operation, wherein the second controlling portion transmits to the first controlling portion the kind of recording material set in advance and the kind of recording material detected by the recording material detecting portion, and wherein the second controlling portion adjusts timing for instructing the first controlling portion to output converted image information so as to control timing for staring to form an image on the recording material, depending on the kind of recording material set in advance and the kind of recording material detected by the recording material detecting portion.

13. The image forming apparatus of claim 12, wherein the second controlling portion starts to form an image after a time depending on a preparation operation has passed when the kind of recording material set in advance and the kind of recording material detected by the recording material detecting portion are different from each other.

14. The image forming apparatus of claim 13, wherein the second controlling portion starts to form an image without performing the preparation operation when the kind of recording material set in advance and the kind of recording material detected by the recording material detecting portion are identical to each other.

15. The image forming apparatus of claim 13, wherein the preparation operation includes any one of an operation for switching conditions for an image formation in the second controlling portion and an operation for generating the converting processing data in the first controlling portion.

16. The image forming apparatus of claim 12, wherein the converting processing data are data for performing color conversion on image information.

17. The image forming apparatus of claim 12, further comprising a recording material storing portion configured to store the recording material, wherein the second controlling portion transmits, to the first controlling portion, the kind of recording material set in advance before the recording material is supplied from the recording material storing portion.

18. The image forming apparatus of claim 17, wherein, when a print starting instruction is received from the first controlling portion, the second controlling portion starts a paper feeding operation of feeding the recording material from the recording material storing portion, to stop conveyance of the recording material at a position where the kind of recording material is detected by the recording material detecting portion, and to restart conveyance of the recording material after detecting the kind of recording material.

* * * * *